Aug. 28, 1956
D. L. GETZ ET AL
2,760,564
FUEL SUPPLY SYSTEM FOR OIL BURNERS
Filed Dec. 11, 1950
7 Sheets-Sheet 1
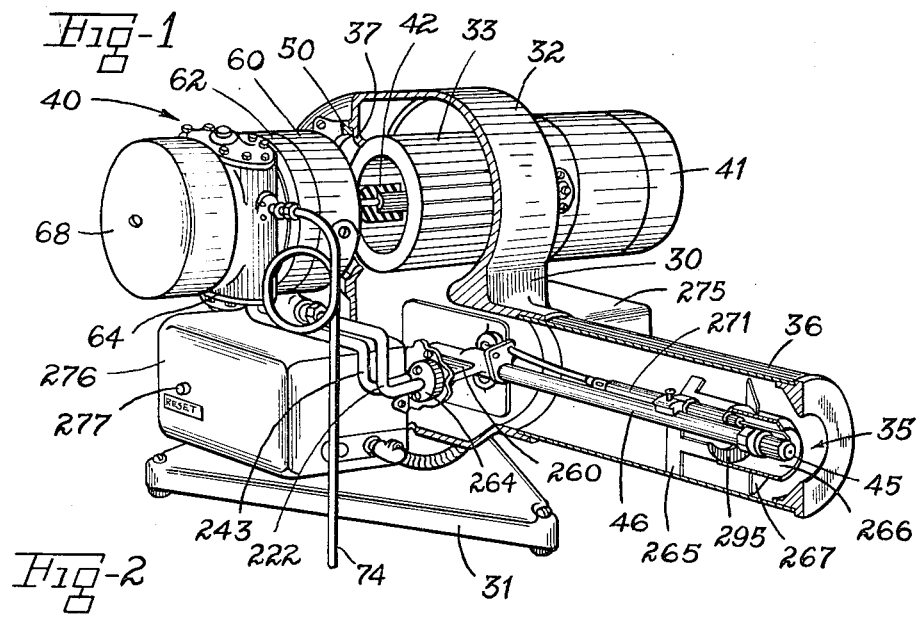
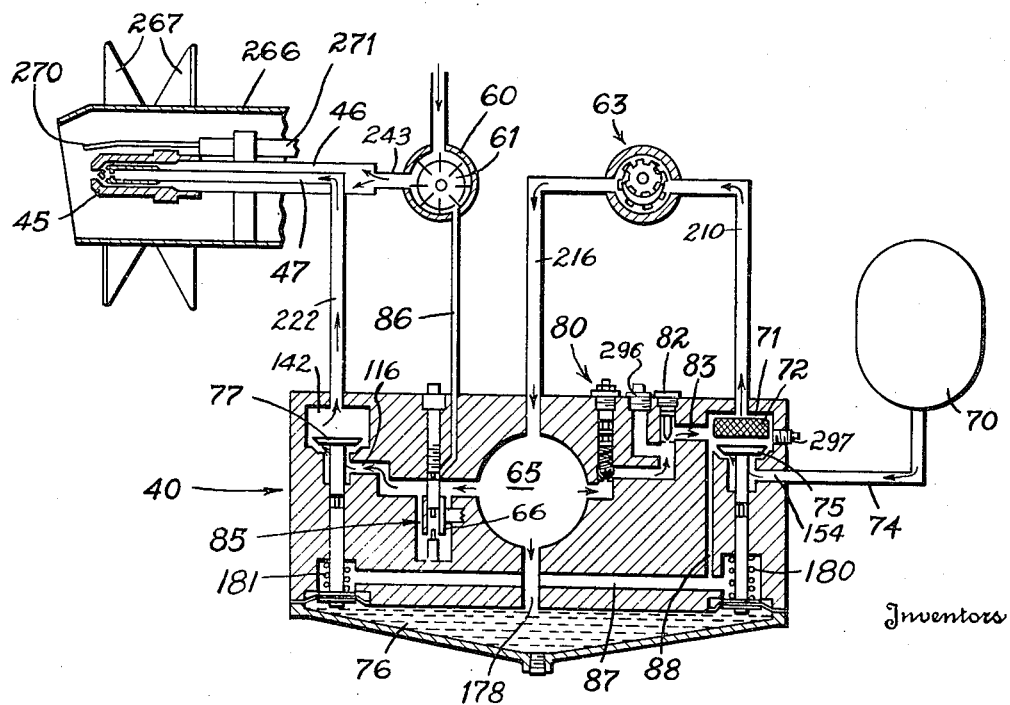
INVENTORS
DELMOND L. GETZ &
ROBERT O. HEDGES
By Marechal & Biebel
ATTORNEYS

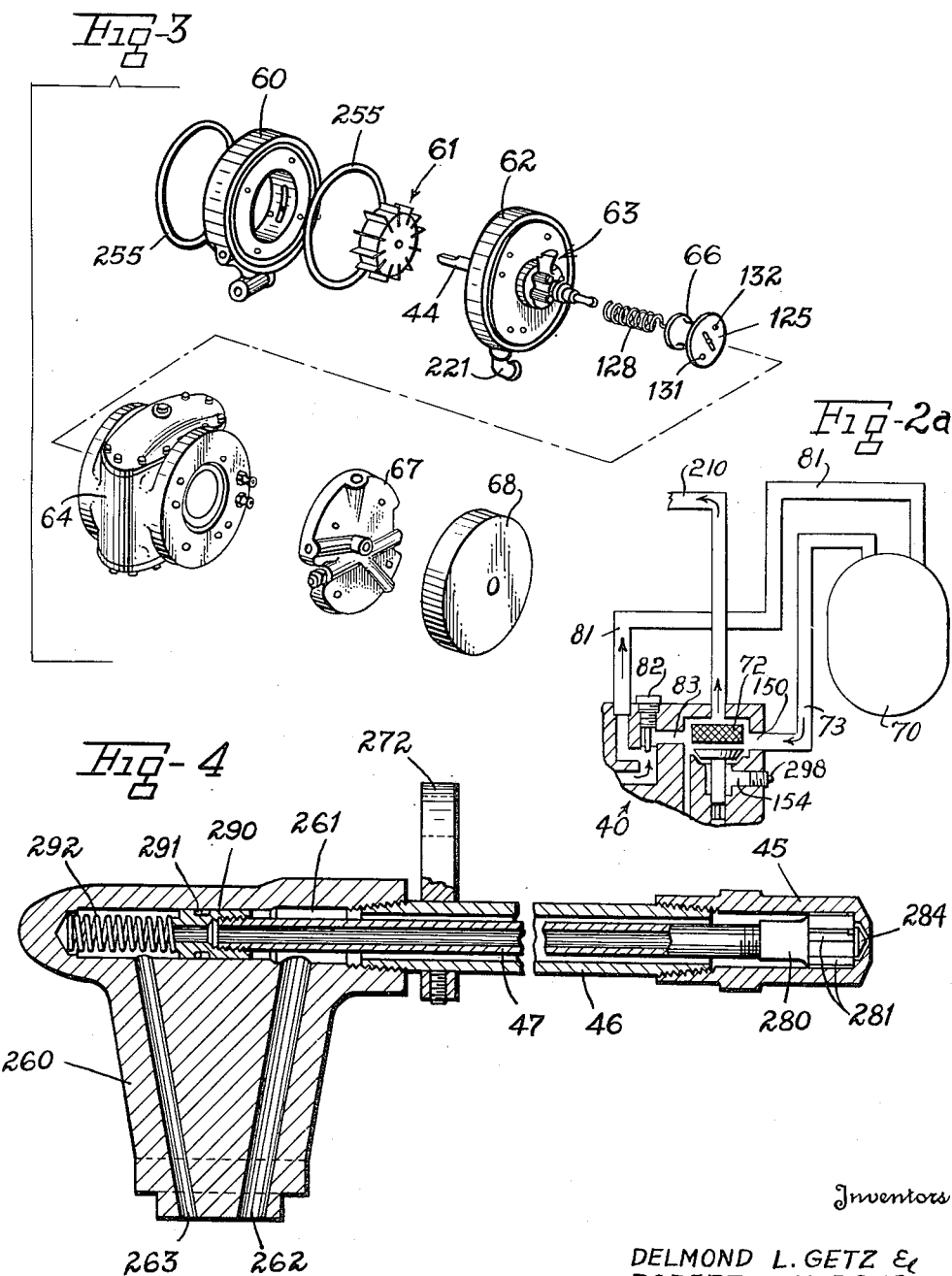

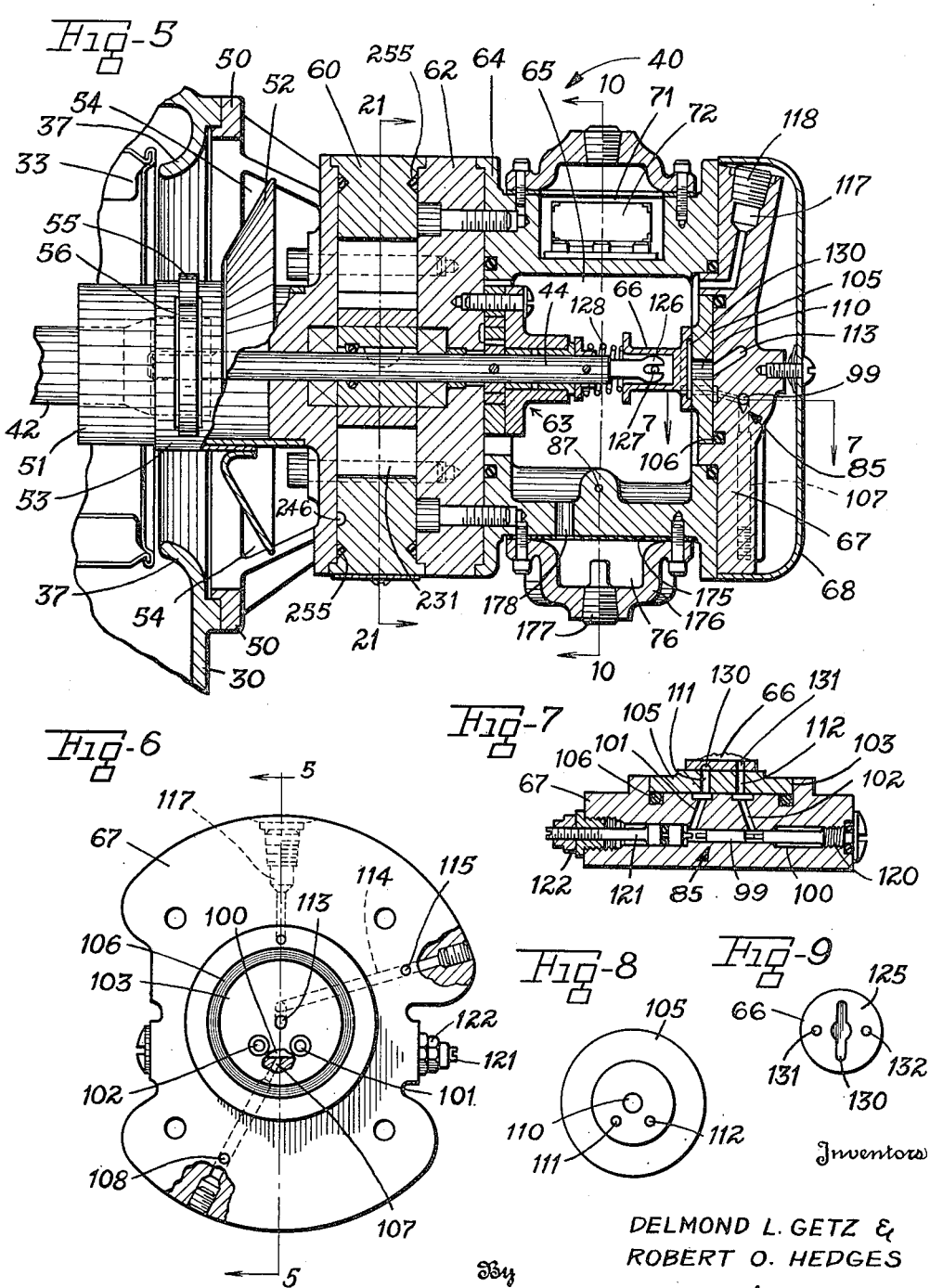

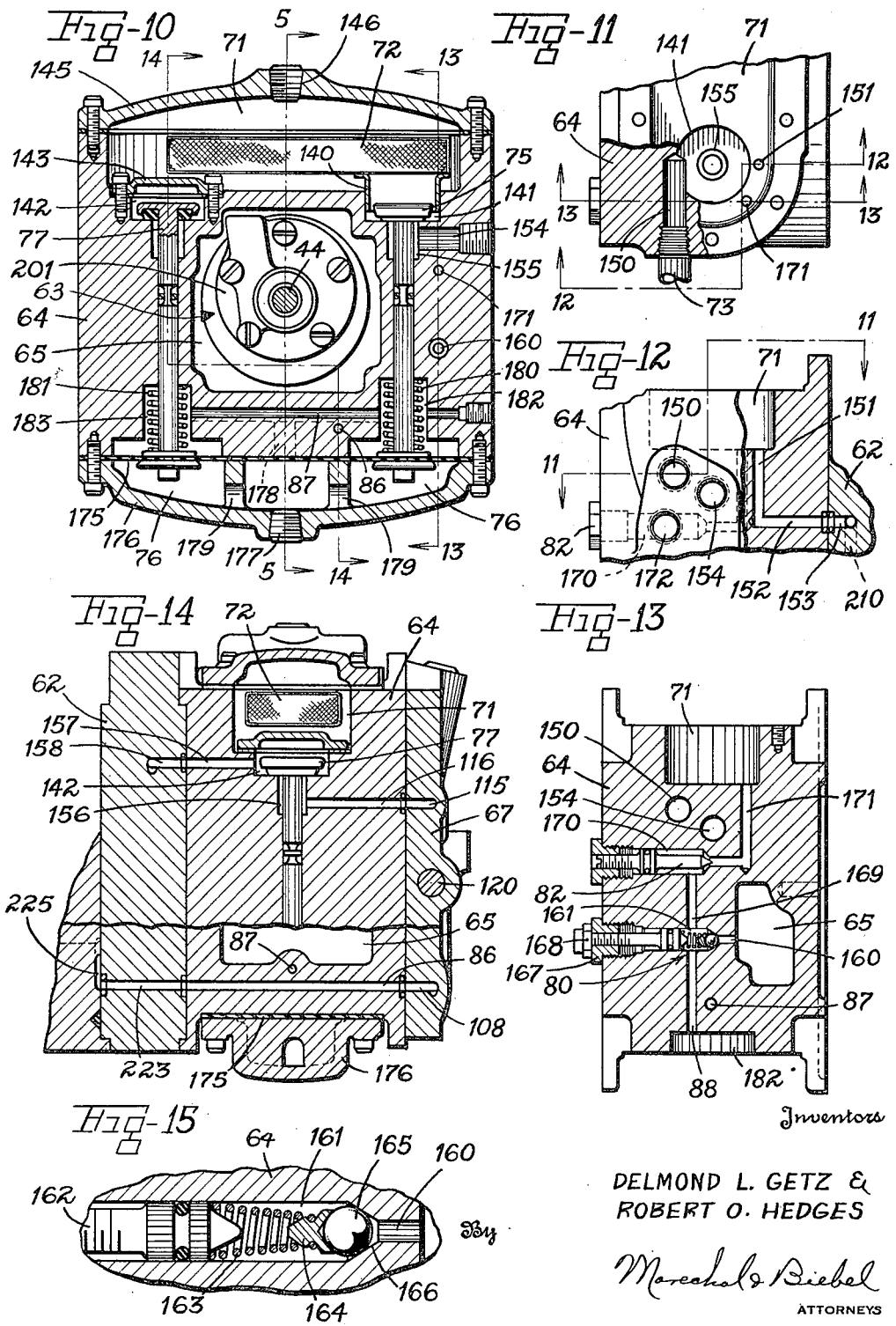

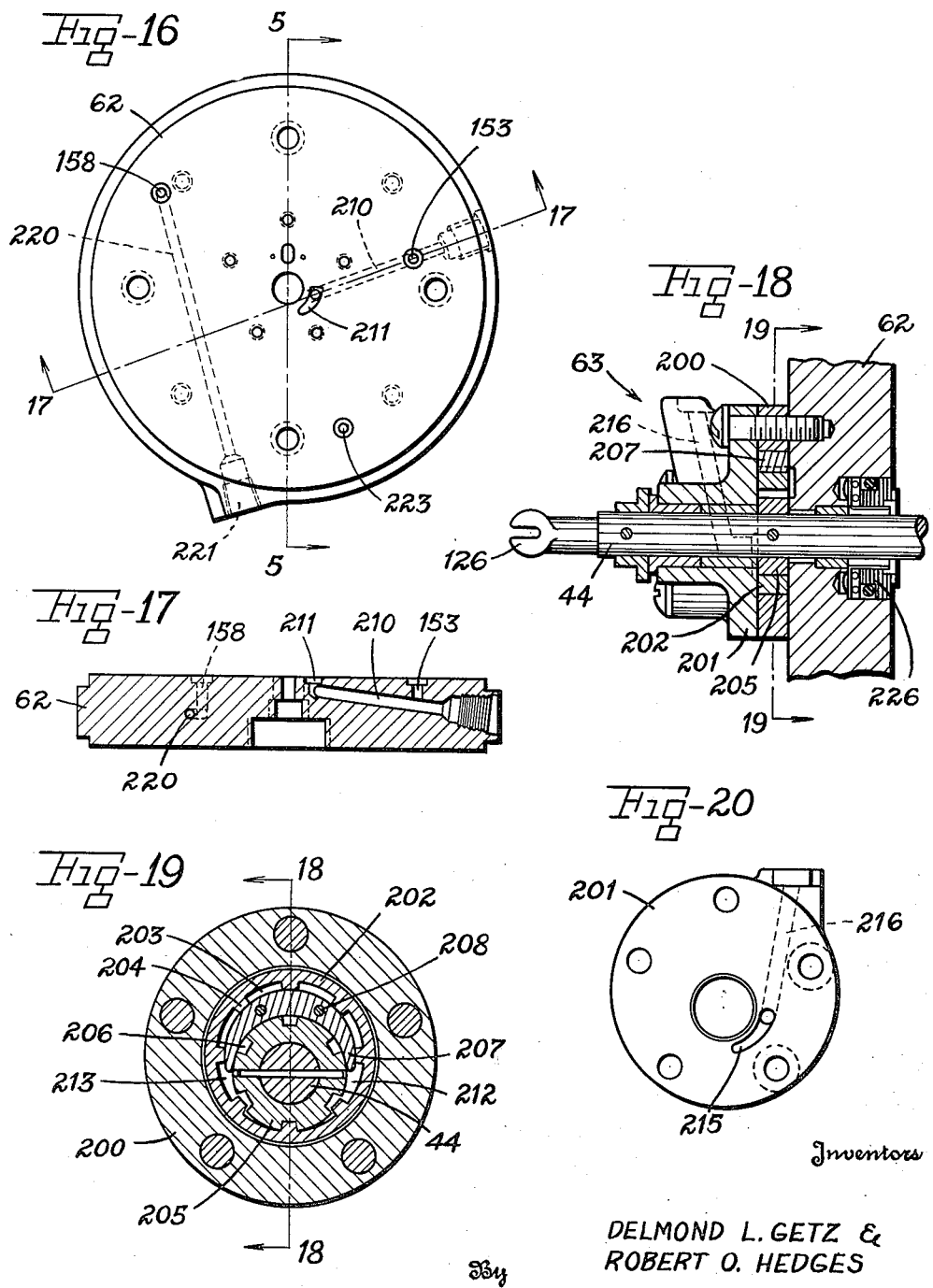

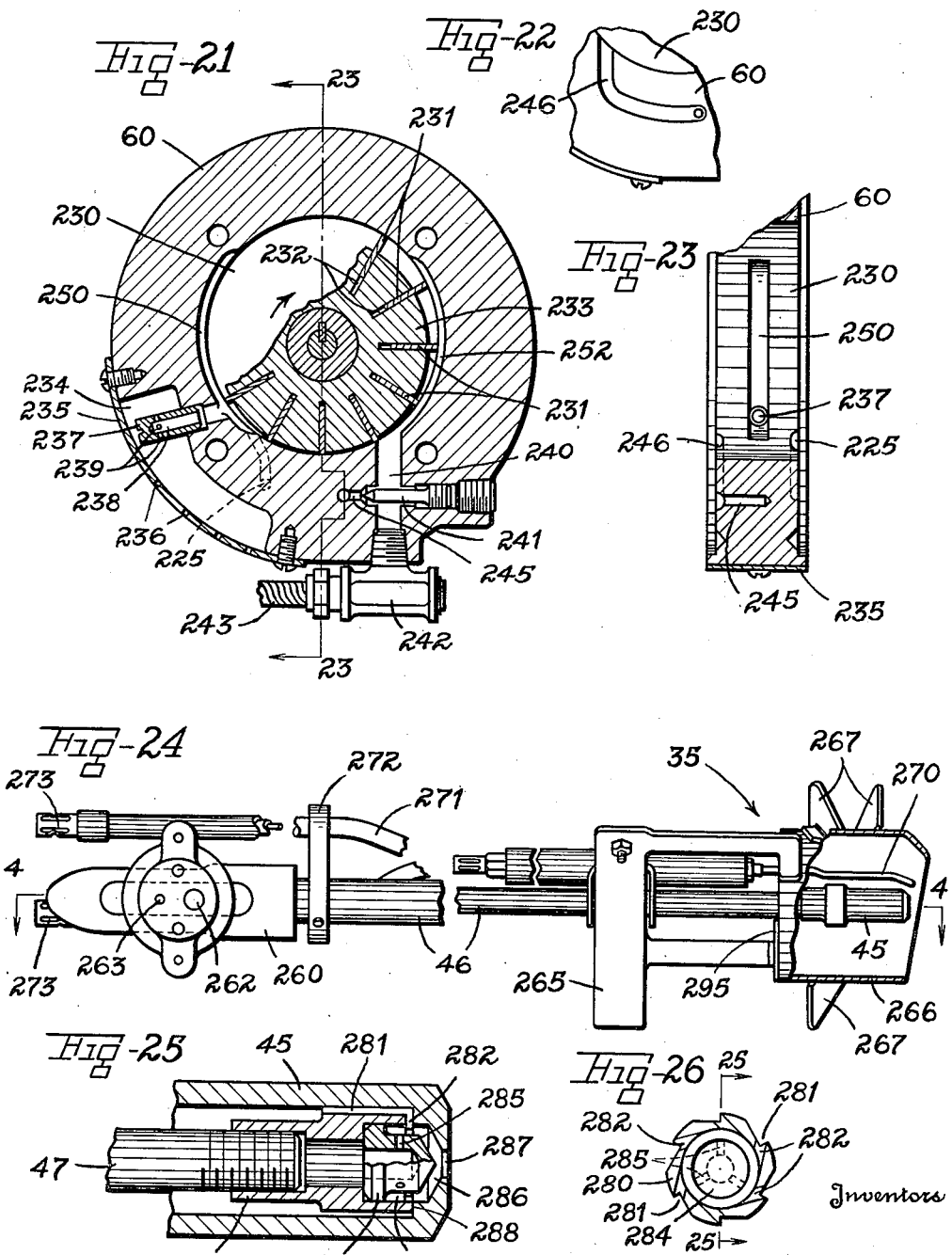

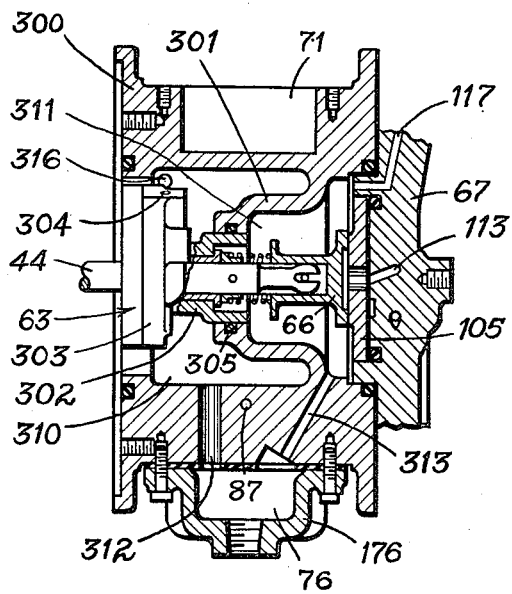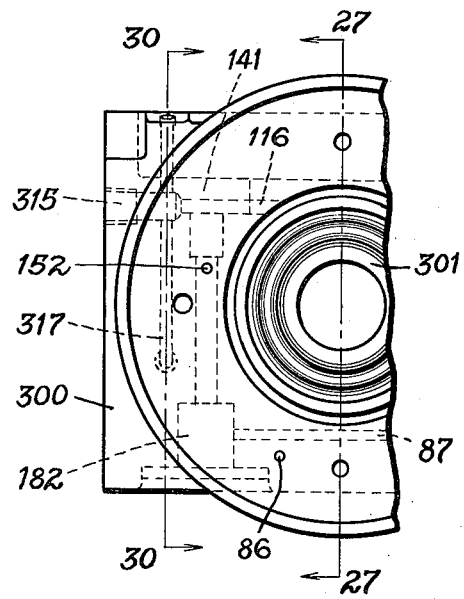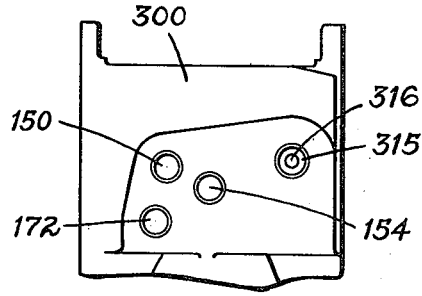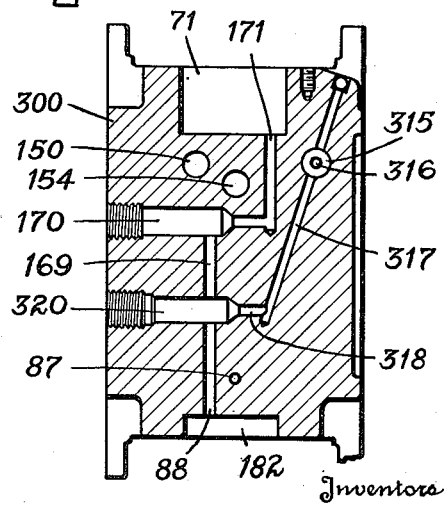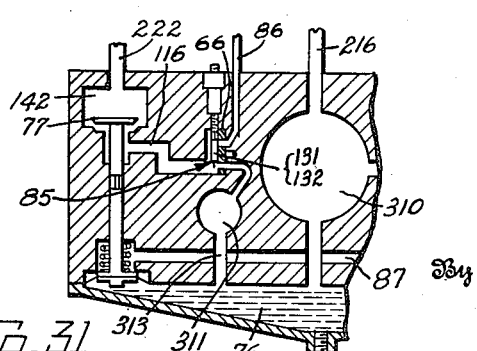

United States Patent Office 2,760,564
Patented Aug. 28, 1956

2,760,564

FUEL SUPPLY SYSTEM FOR OIL BURNERS

Delmond L. Getz and Robert O. Hedges, Springfield, Ohio, assignors, by mesne assignments, to Kelsey-Hayes Wheel Company, Detroit, Mich., a corporation of Delaware Application December 11, 1950, Serial No. 200,232

9 Claims. (Cl. 158—36.3)

This invention relates to oil burners for heating purposes and the like.

It is one of the principal objects of the invention to provide an oil burner which is adapted for conversion use and other installations under varied conditions of physical layout and which will operate effectively and efficiently with fuel oils of a wide range of viscosities and specific gravities.

It is accordingly another object of the invention to provide an oil burner which may be installed in conjunction with either a single line gravity feed supply system, such as is customarily used with inside fuel tanks, or with a two-line suction system such as is customarily used with an outside underground tank. The oil burners of the invention include a suction and pressure pump which is separate from the metering mechanism and which is equipped with selectively usable ports and a by-pass valve arrangement such that the burner may be installed with either type of supply system without adding or changing parts.

A further object of the invention is to provide an oil burner having a simple and effective safety or shut-off valve arrangement operated by hydraulic pressure from the oil pump rather than by air pressure, and particularly to provide such a shutoff valve arrangement which is equally well adapted for single and double line supply systems without modification. Accordingly the burner is provided with a hydraulically operated shutoff valve controlling the oil discharge to the nozzle, and in addition an inlet shutoff valve is provided which is operated by hydraulic pressure from the oil pump to control the flow of oil from the supply tank in a single line gravity feed system but which is by-passed by the supply line in a two-line system to assure proper control over the oil supply with either system without change in the burner construction.

It is also an object of the invention to provide an oil burner which is readily adjustable to meet different desired operating conditions, and particularly to provide a burner wherein either the rate or the pressure of the oil supply or the pressure of the air supply to the nozzle may be separately adjusted as required for proper operation. The burner accordingly includes a suction and pressure pump which supplies oil at an adjustable pressure to a metering unit having a separate adjustable control for determining the rate of flow of the liquid fuel to the nozzle, and the burner also includes an atomizing air pump which supplies primary air to the nozzle separately from the liquid fuel and which is separately adjustable in accordance with the air discharge pressure therefrom. The primary air pressure is thus adjustable independently of the oil pressure and also independently of the secondary air pressure, which is supplied by a separate blower having its own adjustable damped arrangement.

An additional object of the invention is to provide an oil burner which includes a suction and pressure pump adapted to supply oil in excess of the desired rate to a metering unit having a floating piston operated by the supply pressure from the suction and pressure pump to transmit the oil at a metered rate to the nozzle, and it is also an object of the invention to provide such an oil burner in which the rate of the oil supply to the nozzle may be quickly and easily adjusted by changing the stroke of the metering unit piston without changing any parts or otherwise affecting the operation of the burner.

Other objects and advantages of the invention will be apparent from the following description, the accompanying drawings and the appended claims.

In the drawings—

Fig. 1 is a somewhat diagrammatic perspective view of an oil burner in accordance with the invention, with portions broken away to illustrate details of internal construction and arrangement;

Fig. 2 is a schematic diagram illustrating the operation of the oil burner in conjunction with a single-line supply system;

Fig. 2a is a fragmentary view similar to Fig. 2 and illustrating a two-line supply system for the oil burner;

Fig. 3 is an exploded perspective showing the several subassemblies and other component parts of the pump assembly for the oil burner;

Fig. 4 is a sectional view showing portions of the nozzle assembly, the view being generally in section on the line 4—4 of Fig. 24;

Fig. 5 is a vertical section through the pump assembly on the line 5—5 of Fig. 6 and also of Figs. 10 and 16;

Fig. 6 is a view in elevation, partly broken away, showing the inner face of the port plate at the outer end of the pump assembly;

Fig. 7 is a fragmentary section through the port plate and rotary valve on the line 7—7 of Fig. 5;

Fig. 8 is a detail elevational view of the valve insert in the port plate;

Fig. 9 is a detail elevational view of the end face of the rotary valve;

Fig. 10 is a transverse section through the valve housing taken on the line 10—10 of Fig. 5;

Fig. 11 is a fragmentary view of the valve housing with its top cover removed, the view being partly in elevation and partly in section on the line 11—11 of Fig. 12;

Fig. 12 is a fragmentary view of the valve housing partly in elevation and partly in section on the line 12—12 of Fig. 11;

Fig. 13 is a section through the valve housing on the line 13—13 of Figs. 10 and 11 with the top and bottom covers and certain other parts removed for clarity of illustration;

Fig. 14 is a section through a portion of the pump assembly taken on the line 14—14 of Fig. 10;

Fig. 15 is an enlarged fragmentary view of the pressure relief valve in the valve housing;

Fig. 16 is an elevational view of the face of the pump plate which supports the suction and pressure pump;

Fig. 17 is a section on the line 17—17 of Fig. 16;

Fig. 18 is a fragmentary section on the line 18—18 of Fig. 19 showing the suction and pressure pump assembly;

Fig. 19 is a section on the line 19—19 of Fig. 18 on a larger scale;

Fig. 20 is a detail elevational view of the inner face of the end plate of the suction and pressure pump;

Fig. 21 is a transverse section through the atomizing air pump taken on the line 21—21 of Fig. 5;

Fig. 22 is a fragmentary elevational view of one face of the air pump;

Fig. 23 is a fragmentary section through the air pump on the line 23—23 of Fig. 21 and with the rotor removed;

Fig. 24 is a view partly in side elevation and partly broken away showing the combustion head assembly of the oil burner;

Fig. 25 is an enlarged fragmentary section taken through the nozzle on the line 25—25 of Fig. 26;

Fig. 26 is an end elevation of the nozzle jet;

Fig. 27 is a sectional view showing a modified construction of the valve housing, the view being in section on the line 27—27 of Fig. 28;

Fig. 28 is a partial view in side elevation of the modified construction of valve housing;

Fig. 29 is a partial side elevational view looking from left to right in Fig. 28;

Fig. 30 is a section on the line 30—30 of Fig. 28; and

Fig. 31 is a fragmentary view similar to Fig. 2 and showing schematically the operation of the burner construction of Figs. 27-30.

Referring to the drawings, which illustrate a preferred embodiment of the invention, Fig. 1 shows the general construction of an oil burner of the low pressure type adapted for conversion use in domestic installations. This burner is shown as including a main housing 30 provided with a pedestal type supporting base 31 and including an upper portion 32 which forms a blower chamber in which is mounted the blower wheel 33 for supplying secondary air to the combustion head 35 at the outer end of the blast tube 36, the housing including a curved portion 37 which provides the air inlet opening to the blower wheel. The pump assembly for supplying oil and primary air to the combustion head, which is indicated generally at 40, and the drive motor 41 for the burner are symmetrically mounted at opposite sides of the housing 30, the blower wheel being mounted on the motor shaft and being connected through a flexible coupling 42 with the drive shaft 44 for the pump assembly. The nozzle 45 is mounted within the combustion head on the outer end of the primary air tube 46, which encloses the oil tube 47.

The blower 33 is provided with an adjustable air damper within the air inlet casting 50. A tubular housing 51 is pressed into the casting 50 and encloses the coupling 42. A conical damper 52 includes a hub portion 53 slidably mounted on housing 51 to control the effective flow area through the radial openings 54 in the inlet casting 50. A U-shaped spring clip 55 is mounted on the hub 53, and its arm portions extend through slots 56 in the hub for frictional engagement with the outer surface of the housing 51 to hold the damper 52 in axially adjusted position thereon. This damper unit is readily adjusted manually by means of suitable pointed tools such as screw drivers readily insertable through the ports 54 for engagement with the end of the damper 52 to slide the damper along housing 51 against the friction of the spring 55. Since the damper is symmetrical in shape and thus acts to regulate uniformly the effective flow area through the ports 54 to the blower wheel, there is at all times a uniform and symmetrically distributed flow of air to the blower for supply to the combustion head of the chamber, reference being made in this connection to our application Serial No. 188,448, filed October 4, 1950, now Patent No. 2,703,608, issued March 8, 1955, to the same assignee as this application.

Fig. 2 shows diagrammatically the general arrangement and operating relation of the major component parts of the burner, and Fig. 3 illustrates the several subassemblies which compose the whole pump assembly of the burner, namely, the atomizing air pump housing 60 and rotor 61, the pump plate 62 which supports the suction and pressure pump 63, the valve housing 64 containing the pressure chamber 65 which receives the discharge from the pump 63 and encloses the rotary valve 66, and the port plate 67 which houses the metering unit and is provided with an end cover 68.

Referring to Figs. 2 and 2a, oil from the storage tank 70 is supplied to a reservoir chamber 71 in valve housing 64 which contains a suitable filtering screen 72. In a two-line supply system, the oil is supplied directly to the reservoir 71 as shown at 73, and in a single line system, the connection between the supply line 74 from the tank and the reservoir 71 is controlled by an inlet shutoff valve 75 operated by hydraulic pressure from the pump 63. From the reservoir 71, the oil is drawn into the pump 63, shown as a gear pump and discharged into the pressure chamber 65, which is connected with an auxiliary pressure chamber 76 for operating the shutoff valve 75 and also a similar hydraulic shutoff valve 77 which controls the oil flow to the nozzle.

The pressure developed in chamber 65 is controlled by a pressure relief valve 80, which opens at a predetermined adjustable pressure to permit the excess oil to recirculate either to the tank 70 by the return line 81 in a two-line supply system or back to the reservoir 71 in a single line system. The valve 82 which controls the by-pass passage 83 to the reservoir is closed when a two-line system is used, as indicated in Fig. 2a, and is opened for a single line system, with the connection for the line 81 being plugged when a single line system is used. Oil at the proper pressure is accordingly supplied from the chamber 65 by the rotary valve 66 to the metering unit, which is indicated generally at 85 in Fig. 2, and thence by way of the outlet valve 77 and the tube 47 to the nozzle 45, where it is mixed with the primary air supplied directly to the nozzle by the air pump 60 through the tube 46 separately from the liquid oil. The line 86 in Fig. 2 represents a passage through which a small quantity of oil is bled from the metering unit 85 to the air pump housing 60 for lubricating purposes, and the lines 87 and 88 are pressure equalizing passages for assuring proper operation of the shutoff valves 75 and 77 as described in detail hereinafter.

Figs. 5–9 illustrate the construction and operation of the port plate 67 and metering unit 85, and also of the rotary valve 66 which controls the passage of oil to and from the metering unit. Referring to Fig. 7, the metering unit includes a floating piston 99 reciprocable in a bore 100 which extends through the port plate 67 and is connected by two passages 101 and 102 with a counterbore 103 in the inner face of the port plate having a valve insert 105 secured therein and sealed by an O-ring 106. Another passage 107 leads from the bore 100 to a port 108 in the inner face of the port plate 67 which matches one end of the passage 86 in valve housing 64 (Fig. 14) for lubricating the air pump.

The valve insert 105 has a central port 110 therethrough and also a pair of ports 111 and 112 which match the passages 101 and 102 in the port plate 67. The port 110 matches the port 113 in the face of the port plate, and a passage 114 connects the port 113 with port 115 which forms the ultimate pressure discharge port from the metering unit and matches the outer end of a passage 116 (Fig. 14) in the valve housing 64. The passage 117 in the port plate is utilized only for connecting a pressure gauge in testing the pressure in chamber 65 and for venting air from the chamber before starting the burner for the first operation, and it is normally plugged at 118.

The piston 99 has portions of reduced diameter at either end as shown in Fig. 7 to provide small chamber portions in the bore 100 connecting with the ends of the passages 101 and 102. One end of the bore 100 is closed by a screw plug 120 limiting movement of the piston in that direction. An adjusting screw 121 is mounted in the other end of bore 100 and is provided with lock nuts 122 for holding it in adjusted relation with the plug 120 to vary the stroke of the piston 99, which has sufficient radial clearance in the bore, for example 0.0005 to 0.0010 inch, to permit a very small quantity of oil to bleed to and through the passage 107 for lubricating the air pump.

The operation of the metering unit is controlled by the rotary valve 66, which has a ground and lapped surface 125 for rotating engagement with the mating surface of the valve insert 105. Valve 66 has a bore in its opposite end to receive the forked end 126 of drive shaft 44, which engages a pin 127 within this bore to provide a self-centering drive connection, and valve 66 is held with its surface 125 in close running engagement with valve insert 105 by a spring 128 as shown. A diametral groove 130 in the valve face 125 has an enlarged central portion matching the port 110 in the valve insert 105, and two ports 131 and 132 extend through the end portion of valve 66 at opposite sides of the groove 130 for alternately matching the ports 111 and 112 in the valve insert as valve 66 rotates.

In operation whenever one of the ports 131 matches one of ports 111 and 112, which happens each 90° of rotation of the rotary valve, the other port 111 or 112 will match one end of the groove 130 as shown in Fig. 7. Thus in the position of the parts shown in Fig. 7, the port 112 will be the pressure port through its direct connection by port 131 with the pressure chamber 65 to admit oil under pressure to one end of the metering unit piston 99. At the same time, the port 111 will be connected through groove 130 with port 110 and will thus become the discharge port to transmit the oil from the opposite end of piston 99 to the discharge port 115, with this transfer being under pressure from the oil entering the bore 100 at the other end of piston 99.

It will thus be seen that the metering unit is operated solely by the discharge pressure from the suction and pressure pump 63, and that its operation is alternately to fill and discharge the small chambers in the bore 100 at either end of piston 99, thus providing a metered flow of oil to the nozzle at a rate which depends upon the capacity of these chambers. Since in turn the capacity of the metering unit chambers depends upon the stroke of the piston 99 as governed by the adjustment of the screw 121, it will be seen that the metered rate of oil supply may be quickly and easily adjusted by means of the screw 121 without affecting the operation of any of the other parts of the burner.

The valve housing 64 is shown in detail in Figs. 5 and 10–15. At the upper end of the housing is the reservoir chamber 71 containing the filter screen 72, which has a collar 140 extending in close fitting relation into the counterbore 141 for receiving the inlet shutoff valve 75. The corresponding counterbore 142 for the outlet shutoff valve 77 is provided with a cap 143 sealing it from the chamber 71, and a cover 145 is bolted to the top of the housing 64 to enclose the upper portion of the chamber 71, the cover 145 having a port 146 therein which is used for venting chamber 71 in first starting the burner and is normally plugged.

The port 150 for the inlet line 73 of a two-line supply system opens directly into the counterbore 141 as shown in Fig. 11 to provide for direct flow of oil through the collar 140 and screen 72 to a passage 151 (Fig. 12) having a port 152 at its outer end which matches a port 153 in the mating surface of the pump plate 62. The port 154 for the inlet line of a single line supply system opens into a counterbore 155 below the counterbore 141 and of smaller diameter, with the connection between the counterbore 155 and 141 thus being controlled by the valve 75. The inlet passage 116 (Fig. 14) from the metering unit similarly opens into a counterbore 156 below and of smaller diameter than the counterbore 142 for the valve 77, and the outer passage 157 from counterbore 142 matches a port 158 in the pump plate 62, with communication between the passage 116 and 157 thus being controlled by the valve 77.

A passage 160 (Fig. 13) connects the pressure chamber 65 with a bore 161 housing the pressure relief valve 80, which is shown in detail in Fig. 15. This valve includes an adjusting screw 162 which acts through a conical spring 163 and cap 164 to bias the ball 165 into the tapered seat 166 at the end of passage 160. The screw 162 is adjustable in a bushing 167 threaded into the housing 64 and is provided with a lock nut 168 for holding it in adjusted position. A passage 169 connects the bore 161 with a bore 170 which houses the by-pass valve 82, and a passage 171, which corresponds with passage 83 in Fig. 2, leads from the bore 170 directly to the screen chamber 71. An additional bore 172 forms a port for connecting the bore 170 with the return line 81 to the tank in a two-line supply system and is plugged when a single line supply system is used as described in connection with Fig. 2.

The lower ends of shutoff valves 75 and 77 are secured as shown in Fig. 10 to a flexible diaphragm 175 which forms a gasket between the lower end of the valve housing 64 and its bottom cover 176, which encloses the auxiliary pressure chamber 76 and is provided with a drain plug 177. A passage 178 connects pressure chambers 65 and 76, and passages 179 in the cover 176 connect opposite ends of the chamber 76. The diaphragm 175 is spring loaded by springs 180 and 181 in spring chambers 182 and 183 in the proper direction to close valves 75 and 77. It will be noted that the chamber 183 is shorter than chamber 182 to increase the compression of a spring 181 of the same dimensions as spring 180 and thus to assure that greater hydraulic pressure on diaphragm 175 will be required to open valve 77 than for opening valve 75. The passage 87 connects the spring chambers 182 and 183 to equalize pressures therein, and the passage 88 (Figs. 2 and 13) leads from the chamber 183 to the valve bore 161 to provide a return connection to the suction side of pump 63 for relieving pressure on the spring side of the diaphragm during operation of the valves.

The gear pump and pump plate assembly is shown in detail in Figs. 16 to 20. The pump includes a housing ring 200 bolted between the pump end plate 201 and pump plate 62 to form a track for the pump rotor 202, which is essentially a ring gear having large pockets 203 between its teeth 204. The pump roller 205 is a gear pinned to the shaft 44 and having pockets 206 in its periphery for meshing with the teeth of rotor 202. However, the roller 205 is of substantially less diameter than the inner diameter of rotor 202, and the rotor and roller are accordingly arranged in eccentric relation to leave a space for receiving a crescent 207, which is secured to the pump plate 62 by dowels 208.

As noted, the pump plate 62 has a port 153 which matches the port 152 in the valve housing 64. The port 153 is connected through a passage 210 in the pump plate to the port 211 which matches the space 212 (Fig. 19) at one end of crescent 207 and thus forms the inlet port to the pump 63. The oil entering space 212 is carried by pockets 203 in rotor 202, and by the pockets 206 in roller 205, to the space 213 at the opposite end of the crescent. The space 213 matches a port 215 in the pump end plate 201 which is connected by a passage 216 with the pressure chamber 65. The passage 216 is arranged as shown to discharge the oil upwardly against the top of the pressure chamber 65 to reduce foaming and facilitate air venting the chamber, and the cored arrangement of the parts 211 and 215 is provided to eliminate noise at the discharge side of the pump.

The port 158 in the pump plate 62 which matches the outlet passage 157 from the valve housing 64 leads to a passage 220 having an outlet adapted for connection by a fitting 221 to the line 222 for transmitting the oil to the oil tube 47 to the nozzle. Another passage 223 extends through pump plate 62 and matches the passage 86 in the valve housing and a groove 225 in the side of the air pump housing 60 to transmit oil from the port plate 67 to the air pump for lubricating purposes as described. An end seal for shaft 44 is shown at 226 in Fig. 18.

The air pump is shown in detail in Figs. 21–23. The ring shaped housing 60 encloses a circular chamber 230 in which the rotor 61 rotates eccentrically, the rotor hub being keyed to shaft 44. Multiple vanes or blades 231 are carried loosely in slots 232 in the periphery of the rotor hub 233 and are maintained in contact with the wall of chamber 230 by centrifugal force. The inlet for air to chamber 230 comprises an air reservoir 234 provided with a cover plate 235 having perforations 236 therethrough. This reservoir is connected with the chamber 230 by a screw-like fitting 237 having a hollow bore 238 connected with the reservoir 234 by radially arranged holes 239. This combination of the reservoir with the cover 235 and fitting 237 provides a muffler effect for reducing the noise of the suction of the air into the pump.

The discharge port 240 from chamber 230 is provided with a needle valve 241 for regulating the discharge pressure to the fitting 242 from which a line 243 leads to the air tube 46 to the nozzle, and with this air flow going directly to the nozzle independently of the oil flow from the gear pump and metering unit. The valve 241 controls the by-pass passage 245, which is connected by a groove 246 (Fig. 22) in the face of the pump housing 60 with the suction side of the chamber 230. The groove 225 in the opposite surface of the pump housing matches the passage 223 in the pump plate 62 to transmit the lubricating oil from the metering unit to the chamber 230 for lubricating the rotor assembly. Grooves 250 and 252 are provided in the suction and discharge sides of the chamber 230 to even out pulsations of the suction and discharge air which may result from the multi-vane rotor construction in operation, and O-rings 255 serve as gaskets between the housing 60 and the air inlet casting 50 and pump plate 62.

The combustion head of the burner is shown in detail in Figs. 1, 4 and 24 to 26. The nozzle 45 is threaded on one end of the primary air tube 46, and the other end of this tube is threaded into an adapter 260 having a bore 261 connecting directly with an air inlet passage 262 and an oil inlet passage 263 which are relatively diverging as shown in Fig. 24. The adapter 260 is bolted to the housing 30 as shown in Fig. 1, and the passages 262 and 263 there are connected to the air line 243 and oil line 222 respectively by means of a fitting 264. The air tube 46 is supported within the blast tube 36 by means of a multi-armed bracket 265 of generally Y-shape, to the forward end of which is secured an inner air cone 266 provided with swirl blades 267 for imparting a swirling motion to the secondary air traveling through the blast tube.

The bracket 265 also supports the electrodes 270 for igniting the fuel discharged from the nozzle 45, and the electrode cables 271 are similarly supported on air tube 46 by a spacer 272 and are provided with releasable clips 273 for removable connection to the ignition transformer 275 mounted on the housing 30 below the drive motor 41. Symmetrically mounted on the other side of the housing from the transformer is a primary combustion control unit enclosed within a removable cover 276 and a reset button 277 is provided to reset the primary combustion control in case of a safety shut down of the burner unit.

The oil tube 47 is located within the air tube 46 and extends within the nozzle 45. The nozzle jet 280 is threaded on the outer end of the oil tube 47 and its forward end fits closely within the nozzle 45 and is provided with axially extending saw tooth type grooves 281 in its periphery which terminate at their forward ends in tangential slots 282 as shown in Fig. 26, there being six of these grooves and slots. The jet insert 284 is pressed into the forward end of jet 280 and is provided with three radially arranged ports 285 which are positioned opposite alternate slots 282 as shown in Fig. 26. The conical end portion of the jet insert 284 extends within the recess 286 inside the discharge port 287 of the nozzle 45, but the nozzle jet 280 is of larger diameter at its forward end than this recess so that it seats on the shoulder 288 inside the forward end of the nozzle.

At its rearward end, the oil tube 47 is threaded into a hollow plug 290 (Fig. 4) having a sliding fit in the bore 261 within the adapter 260 and located between the passages 262 and 263 for air and oil. The plug 290 is formed with a circumferential groove for receiving a sealing ring 291 preventing communication between the passages 262 and 263 around the outside of the plug, thus causing the oil from passage 263 to flow directly through oil tube 47 while the air from passage 262 flows outwardly of tube 47 through the annular passageway remaining within air tube 46. A spring 292 is mounted within the adapter and bears against the plug 290 for continuously urging the oil tube 47 and nozzle jet 280 forwardly into the desired seated relation of the forward end of the jet in the nozzle.

Thus in operation, the air supplied through the tube 46 by the air pump is provided with a high velocity swirling motion at the nozzle jet 280, with alternate air grooves in the jet blowing past the outlet of one of the oil ports 285 to pick up particles of oil therefrom. Then as this stream swirls past the next air groove, an additional stream of high velocity air is mixed with it, and this swirling motion is continued until the intimately mixed oil and air stream is forced through the conical annular space 286 and discharged through the port 287 as an air atomized oil spray of the proper cone diameter for mixture with the secondary air supply from the blower for complete combustion.

The desired efficient combustion is aided by the construction and arrangement of the combustion head, and particularly of the inner air cone 266. At its rearward end this cone is provided with a crescent shaped baffle 295 which acts to meter the air flowing directly past and closely adjacent the outlet of the nozzle, particularly along its lower side. Also the front end portion of the cone includes a frusto-conical section which is cut back as shown at a relatively sharp angle to the vertical, for example about 10°, to form a generally oval opening as viewed axially of the cone, with the tapered portion forming a hoodlike deflector which cooperates with the baffle 295 to deflect the air stream passing through the cone downwardly toward the bottom of the combustion chamber. In this connection reference is again made to the above Patent No. 2,703,608.

In installing this burner in connection with a single line supply system, the supply line from the tank is connected as described at the port 154, both of the ports 150 and 172 are plugged, as shown at 296 and 297 in Fig. 2, and the by-pass valve 82 is opened. Then in order to make sure that all oil chambers and passages are thoroughly vented of air and filled with oil, oil is added directly through the port 146 to the chamber 71, and the burner is operated until the oil runs out at the port 117 for attaching a pressure gauge. For a two-line supply system, the port 154 is plugged as indicated at 298 in Fig. 2a, the inlet and return lines are connected to the ports 150 and 172 respectively, and by-pass valve 82 is closed. Then in order to bleed air from the pump assembly, oil is added to both the ports 146 and 117 until it runs out. The port 146 is then plugged and a pressure gauge is installed in the port 117, and the burner is operated until the pressure remains constant as indicated on the gauge, with the air having then been completely bled from the system by way of the return line 81 to the tank.

After the burner is ready for operation and is started with a single line supply system, no oil will flow until sufficient pressure has been built up in the auxiliary chamber 76 to open the inlet shutoff valve 75, thus admitting a fresh supply of oil to the reservoir 71. Satisfactory results have been obtained with the inlet valve 75 set to open at 10 pounds pressure and with the valve 77 opening at 15 pounds of pressure. Thus the outlet valve 77 opens after the inlet valve 75 to permit the metered supply of oil to flow from the metering unit to the oil tube 47 and the nozzle as described. This oil flow will be at the maximum pressure developed in the pressure chamber 65 as determined by the adjustment of the pressure relief valve 80, for example 35 to 40 pounds, and this valve will open when the predetermined pressure is exceeded, causing the excess oil to recirculate by way of the reservoir 71. When the burner is shut off, the pressure in chamber 65 is bled back into the inlet side of the pump through the pressure relief valve to allow the shutoff valves to close by the action of their operating diaphragms, this result being readily obtained with the spring 163 designed as shown to permit initial deflection of ball 165 at a relatively low pressure, such as about 5 pounds, and with the valve seat 166 rough ground to provide an effective bleed passage under the relatively high pressures involved.

The operation of the burner is essentially the same with a two-line supply system except for the fact that the inlet valve 75 is ineffective by reason of the fact that it is by-passed by the direct connection of the supply line 73 with the reservoir 71. Also instead of recirculating excess oil from the pressure chamber back to the reservoir, this excess oil is returned to the supply tank by way of the pressure relief valve and the return line 81. With either supply arrangement, it will be seen that separate adjustments can be made as desired of the supply pressure of the oil, the metered flow of the oil and the supply pressure of either the primary air or the secondary air, each independently of all of the others.

It sometimes happens that air may enter the supply line of an oil burner of this character, as for example if the tank should run dry or if a leak should develop in the supply line of a two-line supply system, and if this air reaches the metering unit before the shutoff valve functions, it results in undesirable operating conditions and excessive oil consumption. Figs. 27 to 31 show a modified construction of valve housing 300 which is especially designed to prevent this result by assuring operation of the shutoff valve before air in the pressure chamber can reach the metering unit, and since the valve housing 300 is in large measure of the same construction as the valve housing 64, the corresponding portions thereof have accordingly been identified by the same reference characters.

As shown in Fig. 27, the valve housing 300 includes an internal web 301 having a central opening for receiving the sleeve like extension 302 on the pump end plate 303, in which the discharge port for oil is indicated at 304, and the junction between the web 301 and sleeve 302 is sealed as by an O-ring 305. The web 301 thus acts to separate the interior of the housing 300 into a primary pressure chamber 310, which corresponds to the pressure chamber 65, and a secondary pressure chamber 311, with the oil under pressure being forced from chamber 310 to chamber 311 by way of a passage 312 to the auxiliary pressure chamber 76 and a further passage 313 leading from the chamber 76 to chamber 311.

A bore 315 is provided for venting chamber 310, this bore being normally plugged, and it is connected with chamber 310 by a passage 316. An additional passage 317 leads from the bore 315 to a passage 318 connecting with the bore 320, which corresponds to the bore 161 in valve housing 64 and in use receives a pressure relief valve such as shown at 80 in Fig. 13. Thus whenever the pressure in the chambers 310 and 311 exceeds the setting of the pressure relief valve in bore 320, the excess oil will be returned to the supply side of the pump by way of the passages 316, 317, 318 and 169 in a manner similar to that described in connection with Fig. 13.

In initially starting the burner with this modified arrangement, the chamber 311 is vented by means of the passage 117 in the port plate 67, and the chamber 310 is vented by way of the bore 315, which is then plugged. The operation of the valve housing is the same under normal conditions as already described for the valve housing 64, with the oil supplied by pump 63 passing from chamber 310 to chamber 311 and thence to the metering unit and nozzle. However, since the connection between chambers 310 and 311 is at the low ends of these chambers, if air should enter the suction line and be pumped with the oil into the chamber 310, it will be trapped at the upper end of this chamber, at least until the pressure in chamber 76 has dropped sufficiently for the shutoff valve to operate. The chamber 311 will accordingly be maintained full of raw oil, and the air will be effectively prevented from reaching the metering unit and the line therefrom to the nozzle.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A fuel supply system for the combustion head of an oil burner, comprising a suction and pressure pump having an inlet for liquid fuel, a pressure chamber connected to receive the output of said pump, means forming a flow passage from said pressure chamber for connection to said combustion head, means in said flow passage for metering the rate of flow of fuel therethrough, a first shutoff valve controlling said flow passage at a position downstream therein from said metering means, a second shutoff valve controlling the flow through said inlet, means normally biasing both said valves to closed position, and hydraulic means having pressure connections with said pressure chamber and responsive to the pressure therein for opening said valves against said biasing means.

2. A fuel supply system for the combustion head of an oil burner, comprising a suction and pressure pump having an inlet for liquid fuel, a pressure chamber connected to receive the output of said pump, means forming a flow passage from said pressure chamber for connection to said combustion head, means in said flow passage for metering the rate of flow of fuel therethrough, a first shutoff valve controlling said flow passage at a position downstream therein from said metering means, a second shutoff valve controlling the flow through said inlet, means normally biasing both said valves to closed position, and separate hydraulic means associated with the respective said valves and having pressure connections with said pressure chamber for opening said valves in response to the development of pressure in said chamber, said hydraulic means for said first valve being responsive to a higher pressure than said hydraulic means for said second valve to cause said first valve to open after said second valve and to close before said second valve.

3. A fuel supply system for the combustion head of an oil burner adapted for use alternatively with a single feed line and with separate feed and return lines, comprising a suction and pressure pump having an inlet for liquid fuel, a pair of inlet ports for said inlet including a first port for connection with such single feed line and a second port for connection with such separate feed line, a pressure chamber connected to receive the output of said pump, means forming a flow passage from said pressure chamber for connection to said combustion head, means in said flow passage for metering the rate of flow of fuel therethrough, a first shutoff valve controlling said flow passage at a position downstream therein from said metering means, a second shutoff valve controlling the flow from said first port to said inlet, means normally biasing both said valves to closed position, hydraulic means having pressure connections with said pressure chamber and responsive to the development of pressure therein for opening said valves against said biasing means, means for selectively closing one or the other of said ports in accordance with the use of said burner with a single feed line or with separate feed and return lines, pressure relief means for releasing excess fuel from said pressure chamber, and means for selectively connecting said pressure relief means directly with the suction side of said pump or with such return line.

4. A fuel supply system for the combustion head of an oil burner, comprising a suction and pressure pump having an inlet for liquid fuel, a pressure chamber connected to receive the output of said pump, means forming a flow passage from said pressure chamber for connection to said combustion head, means forming a portion of said flow passage for metering the rate of flow of fuel therethrough, said metering means including a member movable under the pressure in said pressure chamber to deliver said fuel under said pressure at a metered rate to said combustion head, a first shutoff valve controlling said flow passage at a position downstream therein from said metering means, a second shutoff valve controlling the flow through said inlet, means normally biasing both said valves to closed position, and hydraulic means having pressure connections with said pressure chamber and responsive to the pressure therein for opening said valves against said biasing means.

5. A fuel supply system for the combustion head of an oil burner, comprising a suction and pressure pump having an inlet for liquid fuel, a pressure chamber connected to receive the output of said pump, means forming a flow passage from said pressure chamber for connection to said combustion head, means for metering the rate of flow of fuel through said flow passage including a cylinder forming a portion of said flow passage, a floating piston reciprocable in said cylinder and of lesser length than said cylinder to provide an oil receiving space at each end of said cylinder, means for alternately connecting each said space with said pressure chamber and for simultaneously connecting the other said space with said flow passage to effect reciprocation of said piston and a metered flow of liquid fuel through said flow passage in response to the hydraulic pressure in said pressure chamber, a shutoff valve controlling said flow passage at a position downstream therein from said metering means, means normally biasing said valve to closed position, and hydraulic means having a pressure connection with said pressure chamber and responsive to predetermined pressure therein for opening said valve against said biasing means.

6. A fuel supply system for the combustion head of an oil burner, comprising an upright housing, a suction and pressure pump in said housing having an inlet for liquid fuel, a primary pressure chamber in said housing connected to receive the output of said pump, a secondary pressure chamber in said housing, means connecting the lower ends of said pressure chambers for gravity flow of liquid fuel from said primary chamber to said secondary chamber while trapping air in the top of said primary chamber, means forming a flow passage from said secondary chamber for connection to said combustion head, means in said flow passage for metering the rate of flow of fuel therethrough, a shutoff valve controlling said flow passage at a position downstream therein from said metering means, means normally biasing said valve to closed position, and hydraulic means having a pressure connection with said pressure chambers and responsive to predetermined pressure therein for opening said valve against said biasing means.

7. A fuel supply system for the combustion head of an oil burner, comprising an upright housing, a suction and pressure pump in said housing having an inlet for liquid fuel, a primary pressure chamber in said housing connected to receive the output of said pump, a secondary pressure chamber in said housing, means connecting the lower ends of said pressure chambers for gravity flow of liquid fuel from said primary chamber to said secondary chamber while trapping air in the top of said primary chamber, means forming a port leading from the upper end of said primary chamber and having a removable closure to provide for venting of such trapped air from said primary chamber, means forming a flow passage from said secondary chamber for connection to said combustion head, means in said flow passage for metering the rate of flow of fuel therethrough, a shutoff valve controlling said flow passage at a position downstream therein from said metering means, means normally biasing said valve to closed position, and hydraulic means having a pressure connection with said pressure chambers and responsive to predetermined pressure therein for opening said valve against said biasing means.

8. A fuel supply system for the combustion head of an oil burner, comprising an upright housing, a suction and pressure pump in said housing having an inlet for liquid fuel from the feed line from a reservoir, a primary pressure chamber in said housing connected to receive the output of said pump, a secondary pressure chamber in said housing, means connecting the lower ends of said pressure chambers for gravity flow of liquid fuel from said primary chamber to said secondary chamber while trapping air in the top of said primary chamber, pressure relief means connected with the upper end of said primary chamber to release trapped air and excess oil therefrom in response to development of a predetermined pressure therein, means for connecting said relief means with a return line to the reservoir to vent said trapped air, means forming a flow passage from said secondary chamber for connection to said combustion head, means in said flow passage for metering the rate of flow of fuel therethrough, a shutoff valve controlling said flow passage at a position downstream therein from said metering means, means normally biasing said valve to closed position, and hydraulic means having a pressure connection with said pressure chambers and responsive to predetermined pressure therein for opening said valve against said biasing means.

9. A fuel supply system for the combustion head of an oil burner, comprising an upright housing, a suction and pressure pump in said housing having an inlet for liquid fuel, a primary pressure chamber in said housing connected to receive the output of said pump, a secondary pressure chamber in said housing, means connecting the lower ends of said pressure chambers for gravity flow of liquid fuel from said primary chamber to said secondary chamber while trapping air in the top of said primary chamber, means forming a flow passage from said secondary chamber for connection to said combustion head, a floating piston reciprocable in said cylinder and of lesser length than said cylinder to provide a liquid fuel receiving space at each end of said cylinder, means for alternately connecting each said space with said pressure chamber and for simultaneously connecting the other said space with said flow passage to effect reciprocation of said piston and a metered flow of liquid fuel through said flow passage in response to the hydraulic pressure in said pressure chamber, a first shutoff valve controlling said flow passage at a position downstream therein from said metering means, a second shutoff valve controlling the flow through said inlet, means normally biasing both said valves to closed position, and separate hydraulic means associated with the respective said values and having pressure connections with said pressure chambers for opening said valves in response to the development of pressure in said chambers, said hydraulic means for said first valve being responsive to a higher pressure than said hydraulic means for said second valve to cause said first valve to open after said second valve and to close before said second valve.

(References on following page)

References Cited in the file of this patent

UNITED STATES PATENTS

| | | |
|---|---|---|
| 1,565,996 | French | Dec. 15, 1925 |
| 1,641,581 | Egan | Sept. 6, 1927 |
| 1,740,587 | Greenfield | Dec. 24, 1929 |
| 1,745,329 | Hammer | Jan. 28, 1930 |
| 2,117,512 | Scott | May 17, 1938 |
| 2,119,740 | Fellows et al. | June 7, 1938 |
| 2,137,384 | Browne | Nov. 22, 1938 |
| 2,378,379 | Behrens | June 19, 1945 |
| 2,397,986 | Senninger | Apr. 9, 1946 |
| 2,484,920 | Witherell | Oct. 18, 1949 |
| 2,606,497 | Witherell | Aug. 12, 1952 |
| 2,606,499 | Witherell | Aug. 12, 1952 |
| 2,658,567 | Witherell | Nov. 10, 1953 |